United States Patent [19]

Nutter

[11] 4,339,399
[45] Jul. 13, 1982

[54] GAS-LIQUID CONTACT APPARATUS

[76] Inventor: Dale E. Nutter, 7935 S. New Haven St., Tulsa, Okla. 74136

[21] Appl. No.: 267,494

[22] Filed: May 27, 1981

[51] Int. Cl.³ .............................................. B01F 3/04
[52] U.S. Cl. .................................... 261/112; 261/113
[58] Field of Search ................................ 261/112, 113

[56] References Cited

U.S. PATENT DOCUMENTS

| 100,766 | 3/1870 | Huntington | 261/114 R |
|---|---|---|---|
| 556,811 | 3/1896 | Dold | 261/114 R |
| 1,118,267 | 11/1914 | Burhorn | 261/114 R |
| 2,591,343 | 4/1952 | Eld | 261/114 R |
| 2,661,197 | 12/1953 | Norman | 261/112 |
| 2,885,195 | 5/1959 | Haselden | 261/112 |
| 2,998,234 | 8/1961 | Haselden | 261/113 |
| 3,039,749 | 6/1962 | Kohl et al. | 261/112 |
| 3,079,134 | 2/1963 | Winn | 261/113 |
| 3,112,261 | 11/1963 | Porter et al. | 261/112 |
| 3,222,040 | 12/1965 | Eckert | 261/113 |
| 3,343,821 | 9/1967 | Winn et al. | 261/112 |
| 3,533,609 | 10/1970 | Brandt et al. | 261/113 |
| 3,647,191 | 3/1972 | Fordyce | 261/113 |
| 4,171,333 | 10/1979 | Moore | 261/113 |

FOREIGN PATENT DOCUMENTS

| 57796 | 9/1912 | Austria | 261/112 |
|---|---|---|---|
| 3002385 | 9/1980 | Fed. Rep. of Germany | 261/112 |
| 310032 | 9/1955 | Switzerland | 261/113 |
| 2000048 | 1/1979 | United Kingdom | 261/112 |

Primary Examiner—Tim R. Miles
Attorney, Agent, or Firm—Beveridge, DeGrandi & Kline

[57] ABSTRACT

This vapor-liquid contact apparatus, suitable for use in fractionating tower sections, includes a plurality of grids which are arranged in a vertical stack. Each grid is formed of a plurality of parallel, horizontal elongated segments; and, the longitudinal axes of the segments are angularly displaced relative to the segment axis in the grid therebeneath.

Each segment has an upstanding flange which supports a downflowing film of liquid, and a trough portion for receiving liquid which has flowed from the flange. The trough portion is provided with liquid drain openings which are located to allow liquid to flow directly onto contacting upper edges of the flanges of the next lower grid.

The gas flows upwardly through openings which are provided between the flanges and troughs of the segments. The ascending gas strikes mutually inclined lower surfaces, giving the gas a slight angular velocity to promote turbulence in the vicinity of the flanges. A rounded edge formed at the intersection of the inclined lower surfaces minimizes pressure drop while forming the troughs that conduct the downflowing liquid horizontally.

28 Claims, 5 Drawing Figures

GAS-LIQUID CONTACT APPARATUS

BACKGROUND OF THE INVENTION

This invention relates to improved gas-liquid contact apparatus in which a fractionation tower or other vessel is provided with a packing formed of a vertical stack of grids.

Packing materials are used in such processing apparatus to provide (a) a supporting surface for the downward flow of liquid and (b) openings for the upward flow of gases. Liquid which is introduced to the upper end of the packing flows downwardly as a thin film on the surfaces of the packing material. Gaseous vapors are introduced into the lower end of the vessel and ascend through the openings in the packing material, moving through the vessel in intimate turbulent contact with the liquid film on the surface of the packing. Such contact between the fluids can produce a low pressure drop and mass or heat transfer between the liquid and gas streams.

The invention described in this specification is primarily envisioned for use in low pressure drop heat or mass transfer sections of fractionation towers, such sections usually being located where there is a low to moderate liquid flow rate in relation to the gas flow rate. For example, these conditions occur in flash sections of vacuum towers where direct contact between the vapor and the liquid are used to remove heat from the ascending vapor. Ideally, this contact can be achieved with a minimal amount of entrainment of liquid droplets into the gaseous stream, a low pressure differential between the incoming and outgoing streams, and with a continuous well-distributed downflow of liquid which assures effective heat transfer and mass transfer.

A variety of packings are available for the heat and mass transfer sections of fractionation towers but, to the inventor's knowledge, all fall far short of meeting the ideal characteristics listed above. Such packings may provide various sharp downwardly projecting surfaces which cause undue pressure drop in the gaseous stream, they may inherently release liquid droplets which shatter upon impact and promote entrainment of liquid into the gas stream. The packing structure may be weak, limiting the height of bed that can be used without additional supporting structure. The objectives of the present invention are to provide a superior packing material which resists entrainment with a minimum pressure drop and provides an effective contacting relationship between the gas and liquid.

Some earlier packing materials are disclosed in the following U.S. Pat. Nos.

| | |
| --- | --- |
| 100,766 | Huntington |
| 556,811 | Dodd |
| 1,118,267 | Barkom |
| 2,591,343 | Eld |
| 2,885,195 | Haselden |
| 2,998,234 | Haselden |
| 3,533,609 | Brandt et al |
| 3,079,134 | Winn |
| 3,343,821 | Winn et al |

A single-layer liquid distributor for use with random packings is disclosed by the Moore U.S. Pat. No. 4,171,333.

Of the patents listed above, the present inventor regards the materials disclosed in the Brandt et al patent and the Haselden patents to bear some resemblances to the present invention. In these prior devices, the primary openings for the ascending gases are also the primary openings for the downflowing liquid. This increases the likelihood of undue entrainment. Also, the liquid is released from each layer of a grid into the gaseous stream where it drips and/or drains to the next layer. It is believed that this promotes entrainment, both while the drops of liquid are falling and when they impact upon a solid surface where splashing droplets shatter and tend to become entrained. A further problem may arise when the flow rate of gas is so high that it creates a liquid holdup condition in which liquid droplets are unable to form and fall onto the lower layers of the packing.

The Brandt et al and Haselden materials have a configuration which would inherently create structural problems if the individual grids are to be provided with large open areas wherein the vertical projection of the gas openings in each grid is at least 60% of the vertical projection of the area of the entire grid. This is particularly true of the Brandt et al structure in which the gas openings extend to the upper edge of the individual grids, thereby inherently weakening the structure of the layers of the packing. If the open area were very large in the grids shown in Haselden U.S. Pat. No. 2,998,234, the surface area for supporting the liquid would be so substantially reduced that the device would lose its effectiveness; and, with the structure shown in Haselden U.S. Pat. No. 2,885,195, the partitioning and end closure means would make it impossible to achieve sufficient vertical open areas for the gas and surface areas for the liquid.

As previously mentioned, a primary objective of the present invention is to provide a packing which is effective and results in minimal gaseous pressure drop and a minimal entrainment. Additionally, it is an objective to provide a packing which is relatively uncomplicated, easily manufactured and structurally sound.

SUMMARY OF THE INVENTION

In one respect, the present invention involves a gas-liquid contact apparatus in which each grid in a vertical stack has a plurality of parallel elongated upstanding flanges, a plurality of trough portions which lie between the flanges and extend parallel thereto, and a plurality of gas openings which are located between the trough portions and the flanges to permit an ascending stream of gas to flow over and in contact with a film of liquid which is disposed on the flanges. The trough portions each lie in contact with the upper edges of the flanges on the next lower grid, and liquid drain openings are provided in the troughs where they contact the flanges of the next lower grid so that liquid in the troughs will drain gravitationally onto the flanges of the next lower grid.

In another respect, the invention involves a grid formed of a group of segments which each have a bottom wall and at least one upstanding flange. The bottom wall has an upward liquid-supporting surface which is sloped downwardly to a lowermost liquid-releasing distribution point. The distribution point is in contact with an upper edge of an upstanding flange of a grid therebelow so that liquid from the distribution point will flow onto the upstanding flange therebelow. The bottom wall includes gas openings and connector portions. The connector portions are located where they will be struck by liquid which may fall through the openings of the grids thereabove, and these connector portions slope downwardly to the distribution points to carry to the distribution points both the liquid which flows onto the connector portions from the upstanding flanges and the liquid which strikes the connector portions.

From another perspective, the invention relates to gas-liquid contact apparatus in which each grid in a vertical stack of grids is formed of a plurality of segments which have longitudinal axes which are parallel to each other and are angularly disposed relative to the segments in the grid therebeneath. Each segment has a trough portion, a flange portion and connector portions. The trough portions extend longitudinally of the segments and they are provided with a first set of spaced apart drain openings for the gravitational drainage of liquid therefrom. The flange portions have upstanding orientations and they extend longitudinally of their respective segments. The flange portions are spaced from the trough portions, and they have surfaces for supporting thereon a downwardly-flowing film of liquid. The connector portions are longitudinally spaced apart on their respective segments, as they are connected to the flange portions and the trough portions. The connector portions slope downwardly from the flange portions to the trough portions and they have surfaces for carrying liquid from the flange portions to the trough portions. Between the spaced apart connector portions, there is a set of gas openings which permit a stream of gas to pass upwardly through the segments in contact with the liquid on the wall portions. The drain openings in each grid have edges which lie in contact with the flange portions of the grid therebeneath so that liquid will flow from the troughs of one grid onto the upstanding flanges of the grid therebeneath.

There are also a number of preferred features according to the invention. For example, to minimize pressure drop and to enhance the effectiveness of the gas-liquid contact, each of the trough portions has a lower convex surface which is formed to divert the ascending gas toward the gas openings. This convex surface, unlike a sharp edge, minimizes turbulence in the areas where there is no contact of the gas with the liquid; and, it enhances the effectiveness of the apparatus by producing a slight turbulence in the area of gas-liquid contact.

The gas openings in each grid can have an area in which a vertical projection is at least 60% of the total area of the grid in the vertical projection. The drain openings are preferably spaced apart a distance which is equal to the spacing between the upper edges of the upstanding flanges of the given segment. Each trough is located midway between two of the flanges. To promote the distribution of liquid across the surface of the flanges, it is desirable to provide the flanges with holes which lie directly below the drain openings of the grid thereabove. These holes are operable to divert and spread the film of liquid across the surface of the flange.

Finally, it is preferred to form each grid of a plurality of segments which are interconnected discrete members. The interconnection between the segments can be made by having an edge portion of one segment interfit between parallel portions of another segment, one of such parallel portions preferably being formed by striking a tab from the respective segment.

Although the invention may take many forms and is susceptible to a variety of modifications, a preferred but merely exemplary embodiment is described in the following descriptive portions of this specification.

THE DRAWINGS

DESCRIPTION OF A PREFERRED EMBODIMENT

Figure 1:
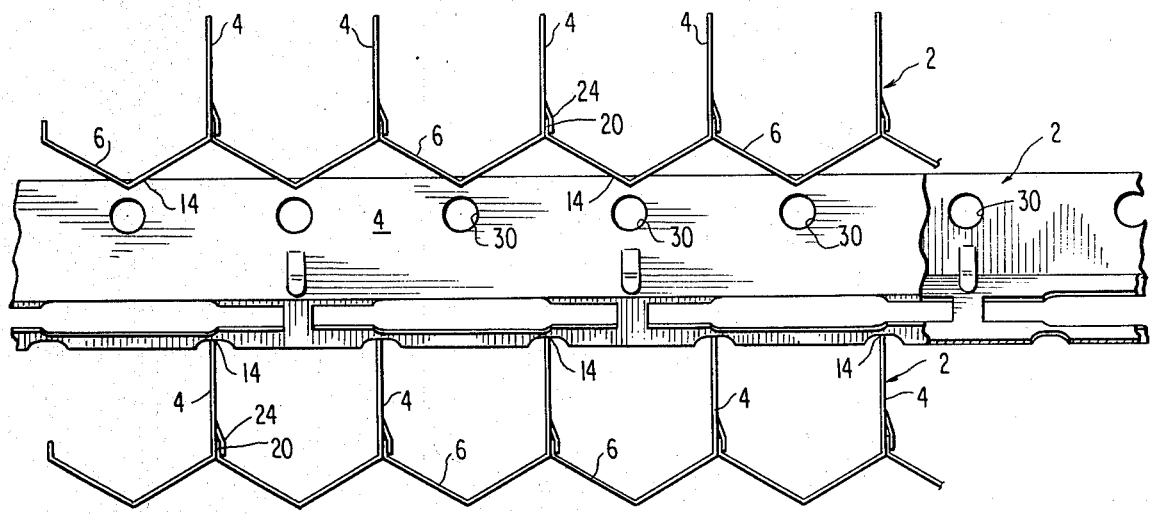
FIG. 1 is a side view of three vertically stacked grids which embody the invention.
Figure 2:
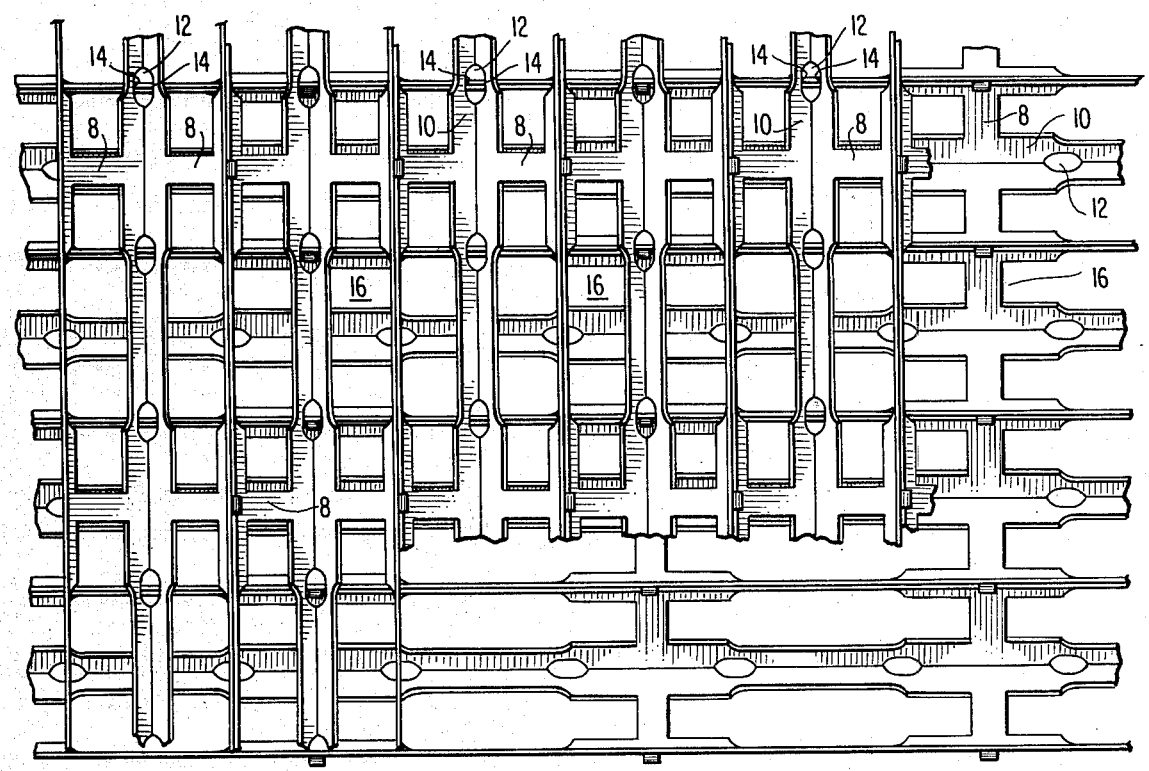
FIG. 2 is a plan view of the three grids shown in FIG. 1.

FIGS. 1 and 2 show a vapor liquid contact apparatus in which three generally horizontal grids 2 are arranged in a vertical stack. Each grid has a plurality of longitudinally extending parallel upstanding flanges 4 which are preferably vertical and provide the primary surfaces for supporting the liquid during its contact with the ascending gas stream. Between each pair of flanges 4, there are longitudinally extending bottom walls 6 which slope downwardly in a shallow V-shape at an inclination angle which preferably is no greater than about 30° C. The upper surfaces of the bottom walls 6 are utilized to support downflowing liquid, preventing the introduction of the liquid into the gaseous stream and directing the liquid to a distribution point where it will be able to flow directly onto the flanges of the next lower grid 2.

Figure 4:
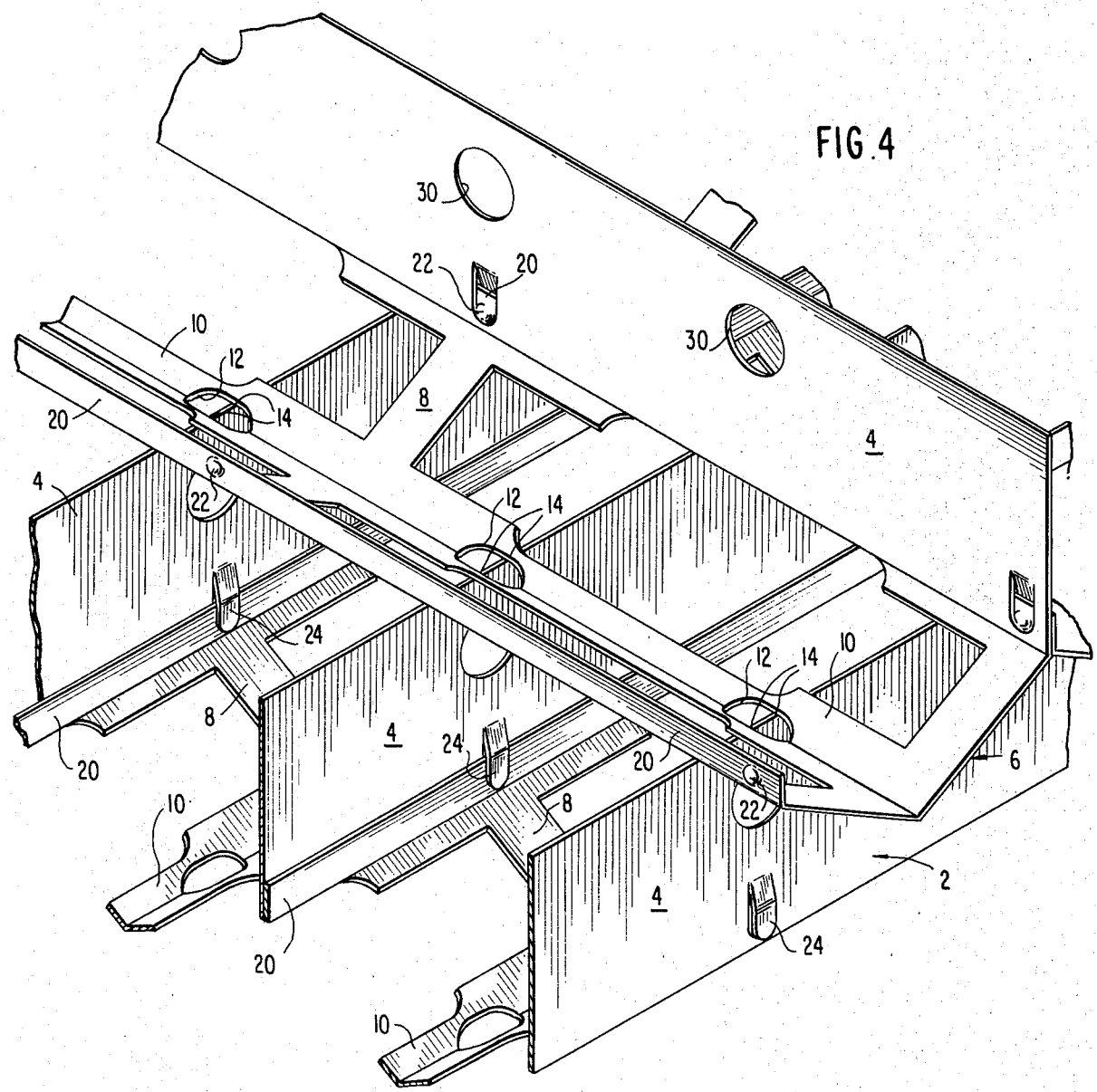
FIG. 4 is a perspective view showing a partially assembled upper grid and its relationship to a lower grid therebeneath.

More specifically, as shown in FIGS. 2 and 4, the bottom wall has a plurality of longitudinally spaced sloped connector portions 8 and longitudinally extending parallel trough portions 10 which preferably lie midway between the flanges 4. Each of the trough portions 10 is provided with a plurality of liquid drain openings 12, the edges of which lie in contact with the upstanding flange portions 4 of the next lower grid. This provides a number of distribution points 14 where liquid flows from the troughs 10 of one grid directly onto the upstanding flanges 4 of the grid therebeneath.

As shown in FIG. 2, the gas openings 16 are relatively large. They are located in the bottom walls 6 and they are bounded by the connector portions 8, the troughs 10 and the upstanding flanges 4. The precise configuration of these openings 6 is not considered critical, and it is believed that the apparatus will work equally well if each of the illustrated generally rectangular openings were replaced by a set of spaced apart circular openings.

The lower surface of the trough has a convex shape for diverting the gas toward the openings 16, imparting to it a slight rotational motion which enhances its contact with the liquid on flange 4. Preferably, this nose is somewhat rounded, having a radius of about 0.25 inch.

Figure 5:
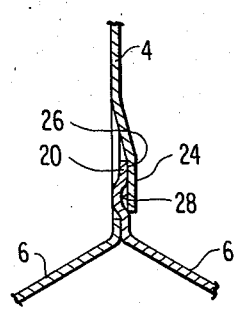
FIG. 5 is a sectional view showing the manner in which two adjacent grid segments are interconnected.
Figure 3:
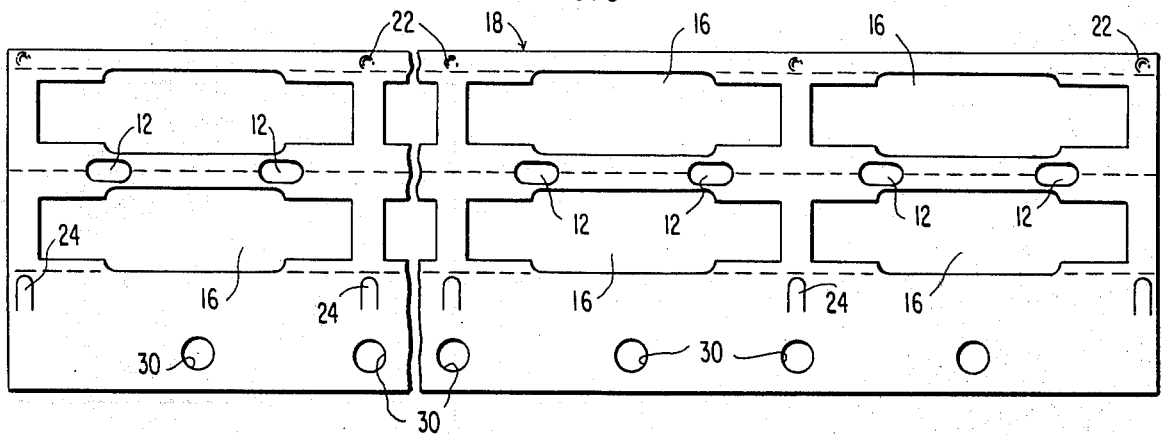
FIG. 3 is a plan view of a flat blank which, after being appropriately bent into configuration, will provide a grid segment for use in connection with the invention.

Although each complete grid may be of a unitary nature, it is preferred that it be formed of a set of interconnected discrete members. The structure of each such member is best seen in FIGS. 3 and 4 wherein FIG. 3 shows a blank 18 used for forming the member and FIG. 4 shows an upper grid which utilizes such a member when bent to its final configuration. In this drawing, it will be seen that the member has one complete flange 4 and one partial flange 20. On the partial flange 20, there is a set of spaced apart dimples 22. At a corresponding spacing, the complete flange 4 is provided with outstruck tabs 24. As shown in FIG. 5, the tabs 24 provide the flange 4 with two parallel surfaces 26 and 28 which lie in spaced parallel planes and are capable of receiving therebetween the partial flange 20. When the pieces are properly fitted together, the edge portion of the partial flange 20 has one surface bearing against the outer surface 26 of flange 4 and its other surface bearing against the inside surface 28 of the tab. The resilience of the tab 24 holds the dimple 22 in the recess formerly occupied by the tab, thereby preventing inadvertent separation of the members.

In order to promote the distribution of liquid horizontally across the full extent of the upstanding flanges, it is desirable to provide the upstanding flanges with holes 30, best seen in FIG. 4, which are located directly below the drain openings 12 of the next higher grid. The liquid, when arriving at the holes 30, will be diverted laterally so that a larger surface area of the vertical flange will be wetted.

By way of example, a suitably dimensioned apparatus according to the invention may have a transverse distance of 2.25 inches between the upstanding flanges 4 and a corresponding 2.25 inch longitudinal distance between the drain openings 12 in the troughs 10. These drain openings 12 have a width of 0.25 inch and a length of 0.5 inch. They are elongated to assure that they will contact the upper edge of the flange 4 of the next lower unit when there is some misalignment or when there are generous fabrication tolerances. The holes 30 in the vertical flanges 4 may have a diameter of about 0.5 inch. The overall height of each segment is about 2.25 inches, and the height of the flange portion thereof is about 1.625 inch. With these dimensions, the apparatus has approximately 28 distribution points per square foot.

Persons familiar with processing apparatus will recognize that the hardware will normally be installed in a fractionating tower, with the ends of the grids being trimmed to fit closely to the interior wall of the vessel. To prevent liquid or vapor bypass, it may be necessary to provide a mechanical sealing means around the circumference of each grid. A thin annular split ring of sheet metal having a width of one or two inches may be used between each grid to close off gaps between the vessel wall and the end of the grid segments for some applications.

Within the fractionating tower, means are provided for distributing liquid onto the upper end of the packing. Suitable distributors are spray nozzles or pans which are notched or perforated. Below the grid system, there is provided a means for introducing the gas and a means for withdrawing the liquid. A gas outlet is provided in the vessel at some point above the packing.

When the apparatus is in operation, liquid is distributed at the upper end of the packing as a spray or as trickle streams. Gas is introduced beneath the lowermost grid and flows upwardly through the packing. Preferably the liquid is distributed directly onto the surfaces of the uppermost grid 2, but any liquid which falls through the gas openings 16 will eventually strike and remain on the surfaces of one of the lower grids. On each grid, the liquid will form downwardly flowing films on both surfaces of each upstanding flange 4. These films flow onto the connector portions 8 which then carry the liquid onto the upper surfaces of the troughs 10. From the troughs 10, the liquid flows through drain openings 12, directly through the distribution points 14 and directly onto the upper edges of the flanges 4 of the next lower grid. This liquid, because it encounters the holes 30, is then diverted laterally so that it covers a large area of the surfaces of the flanges 4. The downflowing liquid is influenced by the inwardly flowing gas which deters the release of liquid from the lower edges of the flanges into the gas openings 16 and also assists in causing the liquid to distribute itself laterally on the flanges 4.

The upwardly flowing gases move through the series of grids 2, in each instance being deflected by the convex lower surfaces of the troughs. This deflection produces a slight turbulence in the gas, and deflects the gas toward and into contact with the liquid film on flanges 4.

Another potential location for this novel packing material would be in connection with random packings such as pall rings, saddles and the like. Two or more stacked grids may be placed directly upon a random packed bed to provide a precisely spaced set of contact points where liquid is distributed into the random packings.

Persons familiar with the field of the invention will recognize that the illustrated apparatus may be modified in many ways. For example, an entire grid may be formed of one unitary piece which includes a plurality of the segments, the drain openings 12 may be open-sided slots or notches rather than being symmetrical on the centerline of the trough portions, and the gas openings 16 and distribution openings 30 may be circular, trapezoidal, triangular or of any other shape.

The connector portions 8 of the different layers may be shifted longitudinally to avoid the illustrated vertically aligned relationship. If desired, each grid may have its segments oriented at an acute angle to its adjacent grids rather than perpendicular thereto as shown. The upstanding flanges 4 are preferably vertical, but they may in some cases be inclined up to about 20° from the vertical. The bottom walls 6, shown as having inclinations of about 30°, may be inclined from the horizontal in the range of about 15° to 45°. In view of the many forms the invention may take, it is emphasized that the invention embraces both the apparatus shown in the drawing and a myriad of variations thereof which fall within the spirit of the following claims.

I claim:

1. Gas liquid contact apparatus comprising a plurality of grids arranged in a vertical stack,
   each grid having a plurality of parallel elongated upstanding flanges, a plurality of trough portions which lie between said flanges and extend parallel to said flanges, and a plurality of gas openings which are located between the trough portions and the flanges to permit an ascending stream of gas to flow over and in contact with a film of liquid which is disposed on the upstanding flanges,
   said trough portions each lying in contact with the upper edges of a plurality of flanges of a grid therebelow, said trough portions having liquid drain openings located where they contact the flanges of a grid therebelow so that liquid in the trough portions will drain gravitationally onto the flanges of the grid therebelow.

2. The apparatus of claim 1 wherein each of the trough portions has a lower surface which is formed to provide a convex surface for diverting the ascending gas toward the gas openings.

3. The apparatus of claim 1 or claim 2 wherein the gas openings in each grid have an area which in vertical projection is at least 60% of the total area of the grid in vertical projection.

4. The apparatus of claim 1 wherein each trough portion has its drain openings spaced apart a distance which is equal to the spacing between the upper edges of its upstanding flanges.

5. The apparatus of claim 1 wherein each trough portion is located midway between two of the flanges.

6. The apparatus of claim 1 wherein the upstanding flanges are provided with holes which lie directly below the drain openings of the grid thereabove, said holes being operable to divert liquid across the surface of the flange.

7. The apparatus of claim 1 wherein said grid is formed of a plurality of interconnected discrete segments.

8. The apparatus of claim 7 wherein the interconnection between the segments includes an edge portion of one segment which has its opposite surfaces contacted by parallel portions of another segment, said parallel portions lying in spaced parallel planes.

9. The apparatus of claim 8 wherein one of the parallel portions is a tab struck from the segment.

10. Gas-liquid contact apparatus comprising a grid which has a plurality of gas openings for permitting the upward flow of a gas therethrough, said grid being formed of a plurality of segments which extend thereacross, each of said segments having a bottom wall and at least one upstanding flange, said bottom wall having an upper liquid-supporting surface which is sloped downwardly to a lowermost liquid-releasing distribution point, said distribution point being in contact with an upper edge of an upstanding flange of a grid therebelow so that liquid from the distribution point will flow onto the upstanding flange therebelow, said bottom wall including said gas openings and a plurality of connector portions, said connector portions being located where they will be struck by liquid which may fall through the openings of the grids thereabove, said connector portions sloping downwardly to the liquid-releasing zone in order to carry to the distribution points the liquid which strikes the connector portions and the liquid which flows onto the connector portions from the upstanding flange.

11. The apparatus of claim 10 wherein the bottom walls include lower surfaces which are formed to provide convex surfaces for diverting the ascending gas toward the gas openings.

12. The apparatus of claim 10 or claim 11, wherein the gas openings in each grid have an area which in vertical projection is at least 60% of the total area of the grid in vertical projection.

13. The apparatus of claim 10 wherein each segment has its distribution points spaced apart a distance which is equal to the spacing between two upstanding flanges.

14. The apparatus of claim 10 wherein each distribution point is located midway between two of the flanges.

15. The apparatus of claim 10 wherein the upstanding flanges are provided with holes which lie directly below the distribution points of the grid thereabove, said holes being operable to divert the film of liquid across the surface of the flange.

16. The apparatus of claim 10 wherein said segments are discrete members which are interconnected to form a said grid.

17. The apparatus of claim 16 wherein the interconnection between the segments includes an edge portion of one segment which has its opposite surfaces contacted by parallel portions of another segment, said parallel portions lying in spaced parallel planes.

18. The apparatus of claim 17 wherein one of the parallel portions is a tab struck from the segment.

19. Gas-liquid contact apparatus comprising a plurality of grids arranged in a vertical stack, each of said grids including a plurality of segments which have longitudinal axes which are parallel to each other and are angularly turned relative to the segments in the grid therebeneath, each of said segments having a trough portion, a flange portion and connector portions, said trough portions extending longitudinally of their respective segments and being provided with a first set of spaced apart openings which are drain openings for the gravitational drainage of liquid therefrom, said flange portions having an upstanding orientation and extending longitudinally of their respective segments, said flange portions being spaced from the trough portions of their respective segments and having surfaces for supporting thereon a downwardly flowing film of liquid, said connector portions being longitudinally spaced apart on their respective segments, said connector portions being connected to the flange portions and the trough portions and sloping downwardly from the flange portions to the trough portions, said connector portions having surfaces for carrying liquid from the flange portions to the trough portions, said segments having, between the spaced apart connector portions, a second set of openings which are gas openings which permit a stream of gas to pass upwardly through the segment in contact with the liquid on the wall portions, said drain openings in each grid having edges which lie in contact with the flange portions of the grid therebeneath so that liquid will flow from the troughs of one grid onto the upstanding flanges of the grid therebeneath.

20. The apparatus of claim 19 wherein each of the trough portions has a lower surface which is shaped to provide a convex surface for diverting the ascending gas toward the gas openings.

21. The apparatus of claim 19 or claim 20 wherein the gas openings in each grid have an area which in vertical projection is at least 60% of the total area of the grid in vertical projection.

22. The apparatus of claim 19 wherein each trough portion has its drain openings spaced apart a distance which is equal to the spacing between the upper edges of its upstanding flange portions.

23. The apparatus of claim 19 wherein each trough portion is located midway between two of the flange portions.

24. The apparatus of claim 23 wherein each of the trough portions has a lower surface which is shaped to provide a convex surface for diverting the ascending gas toward the gas openings.

25. The apparatus of claim 19 wherein the upstanding flange portions are provided with holes which lie directly below the drain openings of the grid thereabove, said holes being operable to divert the film of liquid across the surface of the flange portions.

26. The apparatus of claim 19 wherein said segments are discrete members which are interconnected to form a said grid.

27. The apparatus of claim 26 wherein the interconnection between the segments includes an edge portion of one segment which has its opposite surfaces contacted by parallel portions of another segment, said parallel portions lying in spaced parallel planes.

28. The apparatus of claim 27 wherein one of the parallel portions is a tab struck from the segment.

* * * * *